United States Patent [19]

Serizawa et al.

[11] Patent Number: 4,815,332
[45] Date of Patent: Mar. 28, 1989

[54] DUAL-TYPE DAMPER DEVICE

[75] Inventors: Minoru Serizawa, Komaki; Yutaka Tazuke, Kasugai, both of Japan

[73] Assignees: Tokai Rubber Industries, Ltd.; Toyota Jidosha Kabushiki Kaisha, both of Aichi, Japan

[21] Appl. No.: 917,544

[22] Filed: Oct. 10, 1986

[30] Foreign Application Priority Data

Oct. 15, 1985 [JP] Japan ............... 60-229500
Oct. 18, 1985 [JP] Japan ............... 60-160357[U]

[51] Int. Cl.⁴ ............................................. F16F 15/10
[52] U.S. Cl. .............................. 74/573 R; 74/574; 464/27
[58] Field of Search ............. 74/573 R, 574, 572; 464/27

[56] References Cited

U.S. PATENT DOCUMENTS

| 3,861,828 | 1/1975 | Biermann et al. | 74/574 |
| 3,945,269 | 3/1976 | Bremer | 74/574 |
| 4,041,803 | 8/1977 | Goloff et al. | 74/574 |
| 4,095,485 | 6/1978 | Hiersig | 464/27 |
| 4,172,510 | 10/1979 | Forkel | 74/574 |
| 4,317,388 | 3/1982 | Wojcikowski | 74/574 |
| 4,516,955 | 5/1985 | Worner et al. | 74/574 |
| 4,580,666 | 4/1986 | Ferguson | 74/574 |

FOREIGN PATENT DOCUMENTS

| 0211552 | 9/1986 | Japan | 74/574 |
| 814062 | 5/1959 | United Kingdom | 74/573 R |
| 1441312 | 6/1976 | United Kingdom | 74/574 |
| 2004974 | 4/1979 | United Kingdom | 74/574 |
| 2146408 | 4/1985 | United Kingdom | 74/574 |

Primary Examiner—Richard E. Moore
Assistant Examiner—Vinh Luong
Attorney, Agent, or Firm—Parkhurst, Oliff & Berridge

[57] ABSTRACT

A dual-type damper device for damping vibration of a rotation axle, has a damper pulley including a boss portion joined to the rotation axle, a cylindrical portion located radially outwardly of the boss portion, and a connection portion connecting the boss portion and the cylindrical portion. A first damper-mass member is disposed radially outwardly of the cylindrical portion of the damper pulley, such that the first damper-mass member is spaced apart from, and concentric with, the cylindrical portion. A first resilient member is interposed between the cylindrical portion of the damper pulley and the first damper-mass member. A second damper-mass member has a cylindrical shape and is disposed concentrically in an inner space of the cylindrical portion of the damper pulley. A second resilient member is disposed between one of axial ends of the second damper-mass member and a corresponding part of the connection portion of the damper pulley which is opposed to the one axial end of the second damper-mass member, so as to secure the second damper-mass member to the connection portion, the second resilient member being subjected to shear deformation thereof due to relative radial displacement between the second damper-mass member and the connection portion of the damper pulley.

13 Claims, 5 Drawing Sheets

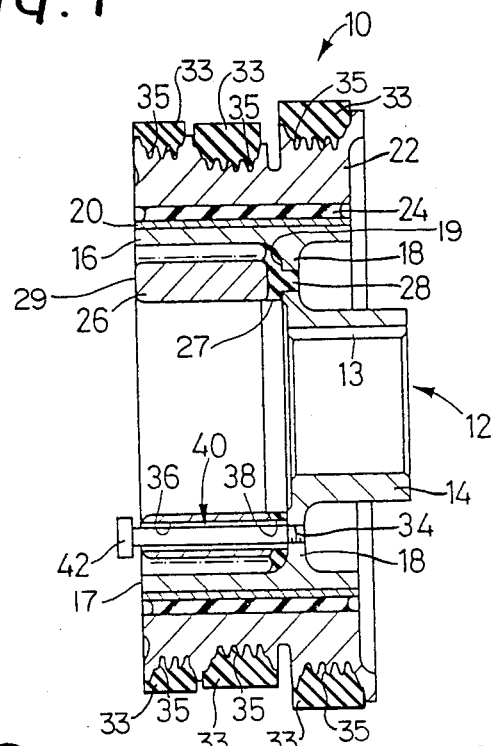
FIG. 1
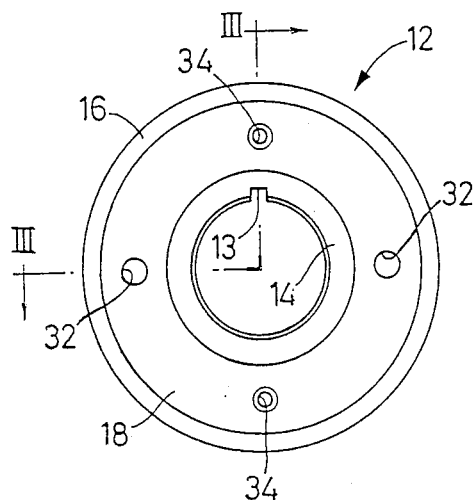
FIG. 2
FIG. 3

FIG. 12
FIG. 13
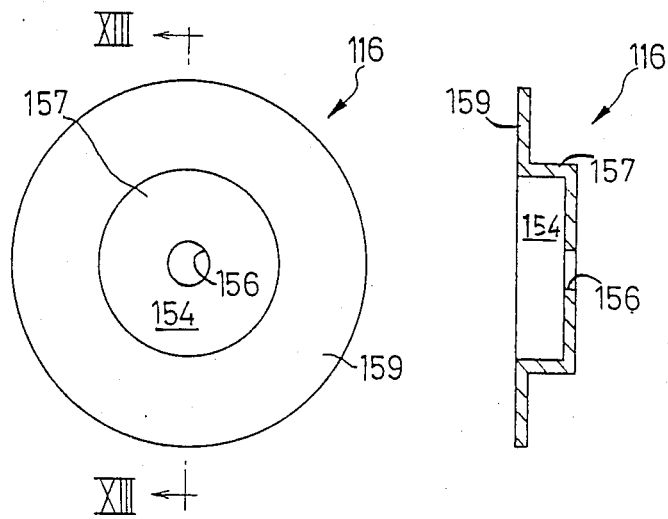
FIG. 14
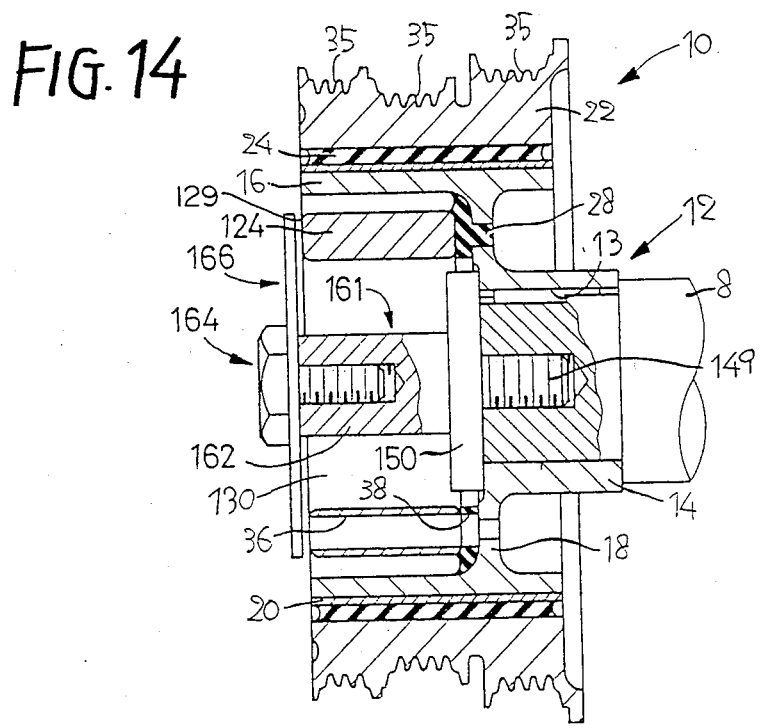

DUAL-TYPE DAMPER DEVICE

BACKGROUND OF THE INVENTION

1. Field of the Art

The present invention relates generally to a dual-type damper device, and more particularly to such damper device for absorbing vibration of, for example, a rotation axle of an internal combustion engine, so as to reduce vibration and noise caused by the vibration of the rotation axle or the engine.

2. Related Art Statement

Generally, a rotation axle of an internal combustion engine, such as a crankshaft, is subjected to a variable torque, while being rotated, and consequently the rotation axle or the engine produces very complex vibration and/or noise. The rotation axle may be broken due to the complex vibration.

As background to the art, a method has been employed for attaching a flywheel to a rotation axle of an engine of an automotive vehicle, in order to level the variable torque exerted to the rotation axle. Further, the Japanese Utility Model Applications laid open under Publication No. 55-135835 and No. 56-115050, disclose a so-called dynamic damper device, a torsional damper device which incorporates a secondary vibration system. The torsional damper device has a generally cylindrical shape and is joined to a rotation axle (primary vibration system) of an engine. The secondary vibration system is adapted to resonate with the rotation axle, so as to absorb or restrain vibration and/or noise caused by the vibration of the rotation axle.

There is known an example of such a torsional damper device which comprises a damper pulley including a boss portion joined to a rotation axle such as a crankshaft, a damper-mass member which is disposed radially outwardly of the damper pulley such that the damper-mass member and the damper pulley are concentric with each other, and a buffer member in the form of a cylindrical resilient member which is interposed between the damper pulley and the damper-mass member. The resilient member is made of a rubber material or the like. The torsional damper device is designed to reduce vibration and/or noise produced by the engine, by means of narrowing resonance amplitude of the torsional vibration of the rotation axle (crankshaft).

However, vibration produced by the rotation axle is a complex vibration including two main components, torsional vibration (vibration in circumferential directions of the rotation axle) and bending vibration (vibration in directions perpendicular to an axis of the rotation axle), and takes a variety of vibration modes depending upon how the rotation axle or the engine is supported by other members. Conventional dynamic damping devices, such as the torsional damper device as indicated above, have been unsatisfactory to damp such complex vibration.

That is because the torsional damper device is capable of damping the torsional vibration of the rotation axle, but incapable of damping the bending vibration of the same. The torsional damper device effectively restrains the torsional vibration through relative displacement between the damper pulley and the damper-mass member due to shear deformation of the cylindrical resilient member therebetween. In order to obtain the desired damping effect on the torsional vibration of the rotation axle, the cylindrical resilient member of the torsional damper device has a comparatively low spring constant in the directions perpendicular to the axis of the rotation axle. Consequently, the thickness of the resilient member is limited to comparatively a small value. The cylindrical resilient member having a low spring constant cannot effectively damp the bending vibration. This is because the resilient member having a low spring constant cannot produce a large tensile or compression deformation thereof to damp the bending vibration. In short, the conventional torsional damper device is effective against the torsional vibration of the rotation axle, but not effective against the bending vibration.

In recent years there has been also proposed a dual-type damper device which incorporates a pair of damper-mass members. The dual-type damper device is joined to a crankshaft of an internal combustion engine, for the purpose of dealing with complicated vibration associated with increased operating performance of the engine.

This dual-type damper device has a construction in which a conventional torsional damper device having a first damper-mass member further incorporates a second damper-mass member of cylindrical shape in an inner space inside the cylindrical portion of the damper pulley, concentrically with the cylindrical portion, and in which between an inside surface of the damper pulley and an outside surface of the second damper-mass member is interposed a cylindrical resilient member with a thin wall. In other words, in comparison with the conventional torsional damper device, the dual-type damper device has a member serving as another first damper-mass member for damping the torsional vibration. This dual-type damper device is also unsatisfactory to damp the vibration of the rotation axle that includes the bending vibration.

Any one of the above-identified conventional damper devices which are used for absorbing or restraining vibration caused by the rotation axle, are effective against torsional vibration of the rotation axle but are not effective against the bending vibration. That is, the conventional damper devices are not effective against the vibration including both the torsional and bending vibrations. Therefore, those devices do not reduce vibration and/or noise caused by a crankshaft of an internal combustion engine. An around-350-Hz noise caused by the bending vibration of the crankshaft makes an uncomfortable knocking noise. The conventional damper devices are incapable of damping the noise around-350-Hz caused by the crankshaft of the internal combustion engine.

SUMMARY OF THE INVENTION

It is therefore an object of the present invention to provide for a dual-type damper which is joined to a rotation axle such as a crankshaft of an internal combustion engine and which is capable of damping both torsional vibration and bending vibration (vibration in directions perpendicular to an axis of the rotation axle) of the rotation axle, so as to effectively reduce vibration and/or noise caused by the vibration of the rotation axle or by operation of the engine.

According to the present invention, there is provided a dual-type damper device for damping vibration of a rotation axle, having (a) a damper pulley including a boss portion joined to the rotation axle, a cylindrical portion located radially outwardly of the boss portion, and a connection portion connecting the boss portion and the cylindrical portion; (b) a first damper-mass member disposed radially outwardly of the cylindrical portion of the damper pulley, such that the first damper-mass member is spaced apart from, and concentric with, the cylindrical portion; (c) a first resilient member interposed between the cylindrical portion of the damper pulley and the first damper-mass member; (d) a second damper-mass member having a cylindrical shape and disposed concentrically in an inner space of the cylindrical portion of the damper pulley; and (e) a second resilient member disposed between one of axial ends of the second damper-mass member and a corresponding part of the connection portion of the damper pulley which is opposed to the one axial end of the second damper-mass member, so as to secure the second damper-mass member to the connection portion, the second resilient member being subjected to shear deformation thereof due to relative radial displacement between the second damper-mass member and the connection portion of the damper pulley.

In the dual-type damper device constructed as described above, the first damper-mass member serves as a first secondary vibration system for damping torsional vibration of the rotation axle (primary vibration system), as in the conventional torsional damper device. That is, the first damper-mass member serves as an effective dynamic damping member for damping the torsional vibration. On the other hand, the second damper-mass member serves as a second secondary vibration system for damping bending vibration of the rotation axle. The second resilient member has a comparatively high spring constant in the directions perpendicular to the axis of the rotation axle. The second resilient member being comparatively soft easily yields to shear deformation thereof, permitting the second damper-mass member to be easily displaced in the directions perpendicular to the axis of the rotation axle. Thus, the second damper-mass member serves as an effective dynamic damping member for damping the bending vibration of the rotation axle.

Joined to a rotation axle such as a crankshaft of an internal combustion engine, the dual-type damper device of the present invention effectively restrains vibration caused by the rotation axle, so that vibration and/or noise produced by the rotation axle or the engine are remarkably reduced. A damper device capable of damping both torsional and bending vibrations of a rotation axle is now available for the first time.

Furthermore, the second secondary vibration system for damping the bending vibration of the rotation axle has a simple construction consisting of the second damper-mass member of cylindrical shape and the second resilient member for securing the second damper-mass member to the damper pulley. A natural frequency of the second secondary vibration system depends upon a mass of the second mass and upon a spring constant of the resilient member. Therefore, the natural frequency of the second secondary vibration system is easily tuned to a resonant frequency of the vibration of the rotation axle that is to be damped. The dual-type damper device having the well-tuned second secondary vibration system exhibits a good damping effect against the vibration of the rotation axle including the bending vibration.

In an preferred embodiment of the invention, the second damper-mass member is secured to the connection portion of the damper pulley, in a process of vulcanization of the second resilient member between the one axial end of the second damper-mass member and the corresponding part of the connection portion.

In another embodiment of the invention, the first damper-mass member is in the form of a V-ribbed cylindrical body which has in an outside surface thereof a plurality of V-grooves around which at least one V-belt is wound.

In still another embodiment of the invention, the dual-type damper device further includes stopper means for preventing the second damper-mass member from falling off the dual-type damper device. The dual-type damper device having the stopper means is safer because the second damper-mass member is stopped from falling-off if by any chance the second resilient member is broken or fractured.

In a preferred form of the above-indicated embodiment, the second damper-mass member has at least one through-hole extending axially of the second damper-mass member, and the stopper means comprises at least one stopper pin which is inserted in the at least one through-hole, such that the at least one stopper pin is fixed at one of axial ends thereof to the connection portion of the damper pulley, the at least one stopper pin having at the other axial end thereof a head portion with a larger diameter than a diameter of the at least one through-hole. In this case, the at least one through-hole may comprise a pair of through-holes which are diametrically opposite to each other.

In another preferred form of the above-indicated embodiment, the stopper means comprises a circular member which is made of a metallic material and which faces the other axial end of the second damper-mass member such that the circular member is spaced a predetermined distance apart from the second damper-mass member, the circular member being secured to one of axial ends of the cylindrical portion of the damper pulley which corresponds to the other axial end of the second damper-mass member. In this case, the circular member may have at a circumferential edge thereof an attachment portion which is secured to the one axial end of the cylindrical portion of the damper pulley. Alternatively, the circular member may have at a circumferential edge thereof a flange-like fit portion which is secured onto an inside surface of the cylindrical portion of the damper pulley, at the one axial end of the cylindrical portion.

In still preferred form, the dual-type damper device further includes a set bolt for joining the boss portion of the damper pulley to the rotation axle, and the set bolt is located inside the second damper-mass member and fixed to the rotation axle. The stopper means comprises a circular member which is fixed at a central part thereof to the set bolt and which faces the other axial end of the second damper-mass member such that the circular member is spaced a predetermined distance apart from the second damper-mass member. In this case, the circular member may have a hat-like shape which includes an inner shallow-cup portion and an outer annular portion, the outer annular portion facing the other axial end of the second damper-mass member, the inner shallow-cup portion being secured to the set bolt. The outer annular portion of the circular member may be located outside the cylindrical portion of the damper pulley, while bottom part of the inner shallow-cup portion is located inside the second damper-mass member. Alternatively, the annular member may have at least one air-communication hole formed therethrough for communicating between the inner space of the cylindrical portion of the damper pulley and an outer space of the dual-type damper.

BRIEF DESCRIPTION OF THE DRAWINGS

The foregoing and other objects, features and advantages of the present invention will be better understood by reading the following description of examples of the invention, when considered in connection with the accompanying drawings, in which:

FIG. 1 is a longitudinal cross sectional view of one example of a dual-type damper according to the present invention, in which a quarter is cut off from the damper;

FIG. 2 is a front view of a damper pulley used in the dual-type damper FIG. 1;

FIG. 3 is a cross sectional view taken along line III—III of FIG. 2, corresponding to FIG. 1;

FIG. 12 is a front view of a hat-like member used in the damper of FIG. 9;

FIG. 13 is a cross sectional view taken along line XIII—XIII of FIG. 12; and

FIG. 14 is a longitudinal cross sectional view of a still further example of a dual-type damper of the present invention, corresponding to FIG. 1.

THE PREFERRED EMBODIMENT OF THE INVENTION

Figure 4:
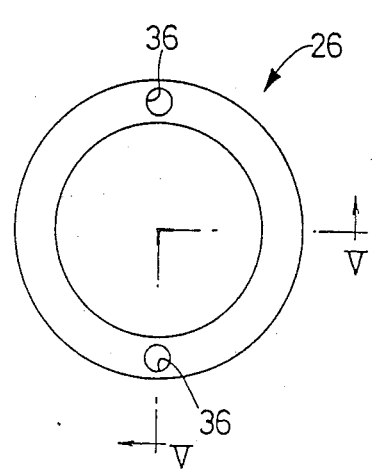
FIG. 4 is a front view of a second damper mass used in the dual-type damper of FIG. 1.

There will be described in detail a preferred embodiment of the present invention, with reference to the accompanying drawings.

Referring first to FIG. 1, there is illustrated a dual-type damper 10 constructed according to the present invention. The dual-type damper 10 serves as not only a vibration damper but also a V-grooved pulley. In the figure, a quarter is cut away from the dual-type damper 10.

Reference numeral 12 designates a damper pulley which is located at a central portion of the dual-type damper 10 and which has a generally cylindrical shape. A first damper mass 22 having a cylindrical shape is disposed radially outwardly of the damper pulley 12 such that the first damper mass 22 and the damper pulley 12 are spaced apart from each other by a predetermined distance and concentric with each other. The first damper mass 22 is made of steel. A first resilient member 24 is interposed between the damper pulley 12 and the first damper mass 22. The first resilient member 24 is made of rubber. A second damper mass 26 having a cylindrical shape is disposed in a cylindrical space inside the damper pulley 12 such that the second damper mass 26 and the damper pulley 12 are spaced apart from each other by a predetermined distance and concentric with each other. The second damper mass 26 is secured at one of axial ends thereof to the damper pulley 12 by means of a second resilient member 28 which is made of rubber. The second damper mass 26 is made of steel.

The damper pulley 12 will be illustrated in greater detail hereafter. The damper pulley 12 is joined to a rotation axle, such as a crankshaft 8 of an internal combustion engine (FIGS. 9 and 14), such that the damper pulley 12 is rotatable together with the crankshaft 8. As shown in FIGS. 2 and 3, the damper pulley 12 includes a boss portion 14, a cylindrical portion 16, and a connection portion 18. The boss portion 14 has a cylindrical shape with a smaller diameter than a diameter of the cylindrical portion 16, and has in an inner surface thereof a key way (groove) 13. The boss portion 14 of the damper pulley 12 is joined to the crankshaft 8. The key way 13 serves as a power-transmission member for transmitting driving power from the crankshaft 8 to one or more V-belts (not shown) wound around the damper pulley 12. The cylindrical portion 16 is located radially outwardly of the boss portion 14 such that the cylindrical portion 16 and the boss portion 14 are spaced from each other by a predetermined distance and concentric with each other. The connection portion 18 connects an outer surface of the boss portion 14 and an inner surface of the cylindrical portion 16. The connection portion 18 transverses a cylindrical space inside the cylindrical portion 16 in a direction of a diameter of the dual-type damper 10 (hereinafter, referred to as "radial direction"), and divides the cylindrical space into one space in which the boss portion is located and the other space which is longer than the one space in a direction of a longitudinal axis of the dual-type damper 10 (hereinafter, referred to as "axial direction"). The other space serves as a second-mass space 30 in which the second damper mass 26 is disposed. The connection portion 16 has a pair of supporting holes 32 and a pair of bolt holes 34. These holes 32 and 34 are formed through the thickness of the connection portion 16, i.e., formed in the axial direction of the dual-type damper 10, and located at a middle part of the connection portion 16 as seen in the radial direction of the damper 10. The holes 32 and 34 are equiangularly spaced from each other, circumferentially of the damper 10, and arranged in an alternate relationship with each other.

The first damper mass 22 which is disposed radially outwardly of the damper pulley 12 extends as long as the cylindrical portion 16 of the pulley 12, as measured in the axial direction of the damper 10. The first mass 22 has on an outside surface thereof a multitude of V-shaped grooves 35. One or more V-belts (not shown) are wound around the V-shaped grooves 35. Thus, the damper pulley 12 serves as a V-belt driving pulley for transferring rotating or driving power from the crankshaft 8 to other members.

Figure 6:
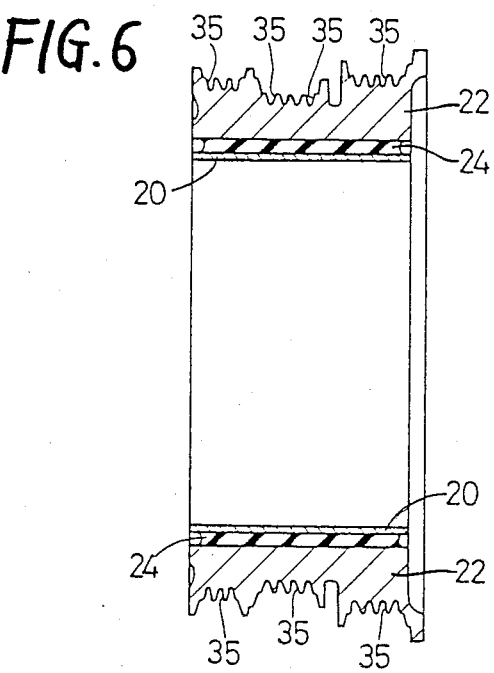
FIG. 6 is a longitudinal cross sectional view of an assembly consisting of a first damper mass, a first resilient body, and a metallic sleeve, which is used in the dual-type damper of FIG. 1.

Referring next to FIG. 6, there is illustrated the first resilient member 24 which is interposed between the damper pulley 12 and the first damper mass 22. Between the first resilient member 24 and the damper pulley 12 there is interposed a metallic sleeve 20 which has a cylindrical shape with a thin wall and which extends as long as the cylindrical portion 16 of the pulley 12. The metallic sleeve 20 is located radially inwardly of the first damper mass 22 such that the sleeve 20 and the first mass 22 are spaced apart from each other by a predetermined distance and concentric with each other. An assembly consisting of the first damper mass 22, first resilient member 24 and metallic sleeve 20 is press-fitted onto an outside surface of the cylindrical portion 16 of the damper pulley 12.

Figure 5:
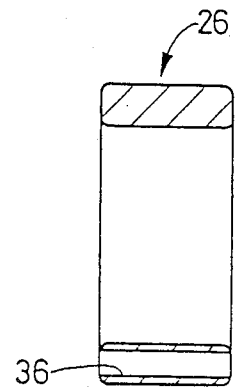
FIG. 5 is a cross sectional view taken along line V—V of FIG. 4.

Referring back to FIGS. 4 and 5, there is shown the second damper mass 26 which is disposed within the second-mass space 30 of the damper pulley 12. The second mass 26 has a pair of though-holes 36 formed therethrough in the axial direction of the damper 10. With the second mass 26 secured to the pulley 12 with the help of the second resilient member 28, the pair of through-holes 32 are in alignment with the pair of bolt holes 34 of the connection portion 18 of the pulley 12, respectively.

As shown in FIG. 1, the annular, second resilient member 28 is disposed between one of the axial ends 27 of the second damper mass 26 and a corresponding part 19 of the connection portion 18 which is opposed to the one axial end of the second mass 26, so that the second mass 26 is supported by the pulley 12 through the second resilient member 28. The second resilient member 28 has a pair of communication holes 38. With the second mass 26 and the second resilient member 28 supported by the damper pulley 12, the communication holes 38 are in alignment with the pair of through-holes 36 of the second mass 26, respectively, and also with the pair of bolt holes 34 of the connection portion 18, respectively. The thus obtained pair of aligned holes serve as service holes for other parts located in the rear of the damper 10.

A stopper pin 40 is inserted in each of the through-holes 36 of the second damper mass 26. The stopper pin 40 is longer than the second mass 26, and has a head 42 with a diameter larger than an inside diameter of the through-holes 36. The stopper pin 40 extends through both the through-hole 36 of the second mass 26 and the communication hole 38 of the second resilient body 28, to reach the damper pulley 12. In other words, the stopper pin 40 is fixed to the connection portion 18 of the pulley 12 by means of screwing one of axial ends of the pin 40 into the bolt hole 34 of the connection portion 18. Between a shaft portion of the stopper pin 40 and a wall of the through-hole 36 of the second mass 26, there is provided a suitable clearance or gap which permits the second damper mass 26 to be displaced a predetermined distance in the radial direction of the damper 10, due to deformation of the second resilient member 28.

Next, a preferred process for manufacturing the dual-type damper 10 constructed as described hitherto will be illustrated below.

First, the first damper mass 22 and the metallic sleeve 20 are held in a concentric relationship with each other, and the first resilient member 24 is formed by vulcanizing a suitable rubber material between the two members 22 and 20. Consequently, the first mass 22 and the sleeve 20 are bonded to each other through the vulcanized first resilient member 24, and the assembly of the three members 22, 24 and 20 are obtained.

Second, the second damper mass 26 is held in the second-mass space 30 of the damper pulley 12 such that the second mass 26 and the cylindrical portion 16 of the pulley 12 are concentric with each other, and a suitable resilient material is injected through the supporting holes 32 into a space between the second mass 26 and the pulley 12. The injected material is vulcanized at that space so as to form the second resilient member 28.

Thus, the second mass is connected at the axial end 27 to the corresponding part 19 of the connection portion 18 which is opposed to the axial end 27 of the second mass 26.

Subsequently, the assembly of the first damper mass 22, first resilient member 24 and metallic sleeve 20 is press-fitted onto the outside surface of the cylindrical portion 16 of the pulley 12. An inside diameter of the metallic sleeve 20 is dimensioned slightly smaller than an outside diameter of the cylindrical portion 16, for the purpose of the press-fitting. Therefore, the first resilient member 24 is pre-compressed, and the assembly of the three members 22, 24 and 20 is firmly joined to the damper pulley 12.

Then, the stopper pin 40 is inserted through each of the pair of through-holes 36 formed in the second damper mass 26, and further through each of the communication holes 38 formed in the second resilient member 28, and fixed to the damper pulley 12, by screwing one axial end of the pin 40 into each of the bolt holes 34 formed in the connection portion 18. Thus, the dual-type damper 10 is obtained.

The dual-type damper 10 produced in the above-described process is located in the internal combustion engine, with an inside surface of the boss portion 14 of the pulley 14 joined to the crankshaft 8 of the engine.

In the dual-type damper 10 of the invention, torsional vibration (vibration in the circumferential direction of the damper 10) caused by rotating of the crankshaft 8 to which the damper pulley 12 is joined is effectively damped through vibration of the first damper mass 22 in the circumferential direction of the damper 10. That is, the first resilient member 24 is deformed due to relative displacement between the pulley 12 and the first mass 22 in the circumferential direction of the damper 10. Thus, the fist damper mass 22 serves as a first damping member (first secondary vibration system) against the torsional vibration. On the other hand, bending vibration (vibration in the radial direction of the damper 10) caused by rotating of the crankshaft 8 is effectively damped through radial vibration of the second damper mass 26. That is, the second resilient member 28 is deformed due to relative displacement between the pulley 12 and the second damper mass 26 in the radial direction of the damper 10. Thus, the second mass 26 serves as a second damping member (second secondary vibration system).

Complex vibration caused by the crankshaft 8 has two major components, the torsional vibration and the bending vibration. The instant dual-type damper 10 according to the present invention is capable of effectively absorbing and restraining both the torsional and bending vibrations. Consequently, vibration and/or noise produced by the internal combustion engine is remarkably reduced by the instant damper 10. In the case where the instant damper 10 is used with an engine of an automotive vehicle, the damper 10 remarkably restrains noise experienced in the passenger's room, particularly around-350-Hz vibration causing uncomfortable knocking noise which has not been restrained by conventional torsional dampers.

It is to be appreciated that the second secondary vibration system of the instant dual-type damper 10, against the bending vibration, has a simple construction in which the second damper mass 26 is connected to the damper pulley 12 through vulcanization of the second resilient member 28 between the two members 26 and 12. It is also to be appreciated that a natural frequency of the second secondary vibration system depends upon the mass of the second damper mass 26 and upon the spring constant of the second resilient member 28. Therefore, the natural frequency of the second secondary vibration system can be easily tuned to a resonance frequency of a crankshaft that is to be damped.

The second damper mass 26 is firmly secured to the damper pulley 12 through vulcanization of the second resilient member 28 therebetween. This construction contributes to preventing the second mass 26 from falling off the damper 10. If by any chance the second resilient member 28 supporting the second mass 26 would break or fracture because of deterioration or the like, the second mass 26 from the damper 10 cannot possibly fall-off because the stopper pin 40 works as a fail-safe mechanism (stopper means) for stopping one axial end 29 of the second mass 26 when the second resilient member 28 possible breaks.

While the present invention has been described in its preferred embodiment with a certain degree of particularity, it is to be understood that the invention is by no means limited thereto, but various changes, modifications, and improvements may be made in the invention, in the light of the foregoing teachings, without departing from the spirit and scope of the invention.

Figure 7:
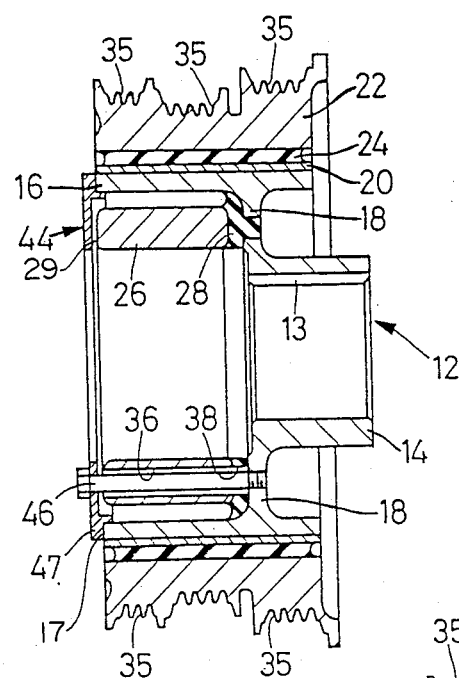
FIG. 7 is a cross sectional view of another example of a dual-type damper according to the invention, corresponding to FIG. 1.

In the illustrative example the fail-safe mechanism (stopper means) for preventing the second damper mass 26 from its falling-off is given in the form of a pair of stopper pins 40 inserted in the respective through-holes 36 of the second mass 26, but other sorts of fail-safe mechanisms may be employed. Four examples of such mechanisms are shown in FIGS. 7, 8, 9 through 15, and 16, respectively. In this connection, it is noted that a part or member having the same reference numeral through all the FIGS. 1-15 has the same function and structure, and therefore re-description about such a part or member will be omitted. In FIG. 7, an annular, stopper member 44 as an example of the fail-safe mechanism has at its circumferential edge an attachment portion 47, and is fixed at the attachment portion 47 to one of axial ends 17 of the cylindrical portion 16 of the damper pulley 12. This fixation of the stopper member 44 to the damper pulley 12 is conducted through a pair of bolts 46 each of which is inserted in the through-hole 36 of the second mass 26 and screwed in the bolt hole 34 of the damper pulley 12. The stopper member 44, fixed to the damper 10, is spaced a predetermined distance apart from one of axial ends 29 of the second damper mass 26 which corresponds to the one axial end 17 of the cylindrical portion 16 to which the stopper member 44 is fixed.

Figure 8:
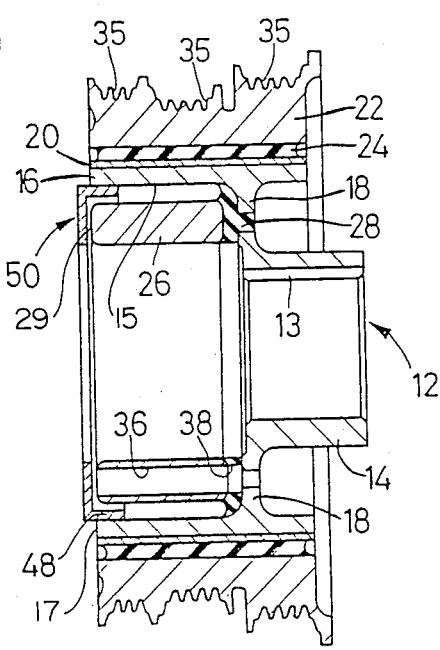
FIG. 8 is a cross sectional view of still another example of a dual-type damper of the invention, corresponding to FIG. 1.

Another example of the fail-safe mechanism is shown in FIG. 8. In the figure, an annular, stopper member 50 as the fail-safe mechanism has at its circumferential edge a flange-like fit portion 48. With the fit portion 48 fitted onto an inside surface 15 of the cylindrical portion 16 which defines therein the second-mass space 30, the stopper member 50 is firmly fixed to the cylindrical portion 16. In this condition, the stopper member 50 is spaced a predetermined distance apart from one of axial ends 29 of the second mass 26 which corresponds to the axial end 17 of the cylindrical portion 16.

Figure 9:
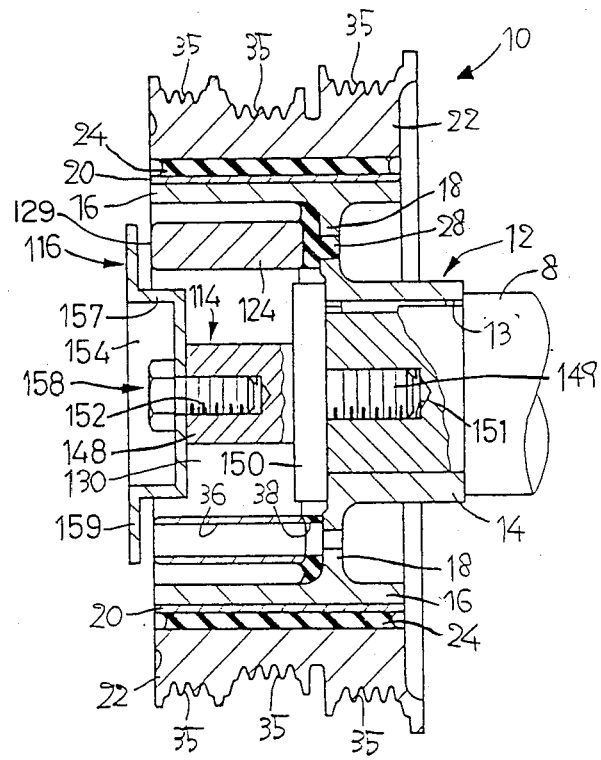
FIG. 9 is a longitudinal cross sectional view of a further example of a dual-type damper of the invention, corresponding to FIG. 1.

A third example of the fail-safe mechanism is shown in FIGS. 9 through 13. In FIG. 9, reference numeral 8 designates a crankshaft of an internal combustion engine. The dual-type damper 10 having the first and second secondary vibration systems are joined to one of axial ends of the crankshaft 8, by means of a set bolt 114.

In this condition, the dual-type damper 10 is in use for damping vibration associated with rotatings of the crankshaft 8. A metallic hat-like member (annular member) 116 is fixed to one of axial ends of the set bolt 114. The other axial end of the set bolt 114 is fixed to the crankshaft 8.

Figures 10, 11:
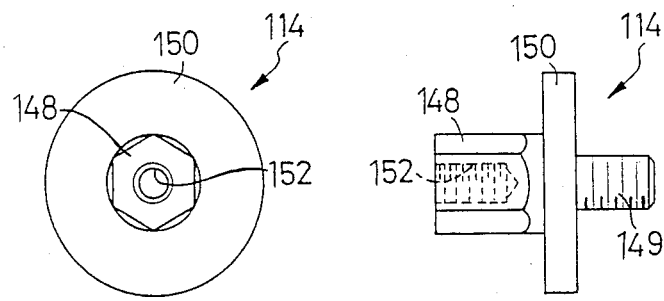
FIGS. 10 and 11 are front and lateral views of a set bolt used in the dual-type damper of FIG. 9, respectively.

Referring to FIGS. 10 and 11, there is illustrated the structure of the set bolt 114. The set bolt 114 is in the form of a hexagon headed bolt which includes a hexagon head portion 148, a shaft portion 149, and a flange portion 150 between the head and shaft portions 148 and 149. The flange portion 150 extends perpendicularly to a longitudinal axis of the set bolt 114. The head portion 148 is comparatively long in the axial direction of the set bolt 114, and has a bolt hole 152 formed at a central part of the head portion 148 in the axial direction of the set bolt 114.

As shown in FIG. 9, the crankshaft 8 to which the dual-type damper 10 is joined has a bolt hole 151 formed at a central part of one axial end of the crankshaft 8, in the axial direction of the crankshaft 8. The set bolt 114 is fixed to the crankshaft 8 by means of screwing the shaft portion 149 into the bolt hole 151. Consequently, the flange portion 150 of the set bolt is forcibly pressed against one of axial ends, of the boss portion 14 of the damper pulley 12, causing damper pulley 12 to be firmly fixed to the crankshaft 8.

Referring next to FIGS. 12 and 13, there is shown the hat-like member 116 which is fixed to a free end of the head portion 148 of the set bolt 114. The hat-like member 116 includes an outer annular portion 159 and an inner shallow-cup portion 157 which is located at a central part of the hat-like member 116. The shallow-cup portion 157 defines therein a cylindrical space 154. The hat-like member 116 has an outside diameter with almost the same length as that of a second damper mass 124. A hole 156 is formed through a central part of the bottom wall of the shallow-cup portion 157. With the outside surface of the shallow-cup portion 157 held in contact with the free end of the head portion 148 of the set bolt (see FIG. 9), an attachment bolt 158 is inserted through the hole 156 and screwed into the bolt hole 152 formed in the head portion 148. In this way, the metallic, hat-like member 116 is secured to the set bolt 114, and to the crankshaft 8. In this connection, it is to be appreciated that the axial length of the head portion 148 of the set bolt 114 is dimensioned smaller than that of the second damper mass 124. Therefore, bottom part of the shallow-cup portion 157 of the hat-like member 116 is located within the inner cylindrical space of the second damper mass 124.

In the above condition, the outer annular portion 159 of the hat-like member 116 is located outside the opening of a second-mass space 130 of the damper pulley 12, such that the annular portion 159 is spaced a predetermined distance apart from the corresponding one of axial ends 129 of the second damper mass 124 disposed in the second-mass space 130. This arrangement contributes to not only permitting the second damper mass 124 to be vibrated or displaced, in the radial direction of the damper 10, due to deformation of a second resilient member 28, but also preventing the second damper mass 124 from falling out of the second-mass space 130 of the damper 10. On the other hand, the head portion of the attachment bolt 158 is located within the cylindrical space 154 of the hat-like member 116. That is, the head portion of the attachment bolt 158 is back from the annular portion 159 of the hat-like member 116. An outside diameter of the shallow-cup portion 157 of the hat-like member 116 is smaller than an inside diameter of the second damper mass 124 by a predetermined length, providing a suitable clearance between the shallow-cup portion 157 and the second damper mass 124. This arrangement contributes to preventing the hat-like member 116 from interfering with the radial vibration of the second damper mass 124 as described above.

The annular portion 159 of the hat-like member 116 is located outside the opening of the second-mass space 130 of the damper pulley 12 in which the second damper mass 124 is disposed, such that the annular portion 159 extends over the opening of the second mass space 130. If by any chance the second resilient member 28 supporting the second damper mass 124 breaks off, a falling-off of the second damper mass 124 out of the second-mass space 30- is completely prevented by the hat-like member 116. In this way, the dual-type damper 10 serve with safety.

It is recommended to form one or more air-communication holes through the hat-like member 116. The air-communication holes contribute to increasing the area of passages for air communication between the second-mass space 130 and an outside space, thereby permitting the second-mass space 130 to radiate heat more effectively. Consequently, the temperature in the second-mass space 130 is kept relatively low, in spite of external heat due to, for example, heat conduction from the engine. Therefore, the second and first resilient members 28 and 24 are protected against their decreased operating performance and/or decreased durability due to heat.

Referring next to FIG. 14, there is illustrated a fourth example of the fail-safe mechanism. The preceding example in the form of the hat-like member 116 is advantageous in that the head portion of the attachment bolt 158 does not interfere with other parts or members of the engine when the dual-type damper 10 is mounted on the engine. This is because the attachment bolt 158 is wholly located within the cylindrical space 154 of the hat-like member 116. However, the hat-like member (fail-safe mechanism, stopper means) 116 may have other shapes, while maintaining the ability of stopping the second damper mass 124 from falling out of the second-mass space 130. In FIG. 14, an annular flat member 166 as the fail-safe mechanism is secured, with the help of an attachment bolt 164, to a free end of a head portion 162 of a set bolt 160. The head portion 162 has an axial length longer by a predetermined length than that of the second damper mass 124.

The hat-like member 116 or annular flat member 166 may be formed together with the set bolt 114 or 160 into a single member, respectively. Furthermore, the hat-like member 116 or annular flat member 166 may be wholly located within the second-mass space 130 of the damper pulley 12. In this case, the second damper mass 124 must be dimensioned such that the opening-side axial end 129 of the second mass 124 is located axially inwardly from the opening of the second-mass space 130 by a predetermined distance when the second mass 124 is disposed in position in the second-mass space 130.

However, the fail-safe mechanism is not essential for the dual-type damper according to present invention. The dual-type damper of the invention may be constructed without a fail-safe mechanism.

Further, the dual-type damper of the present invention is not limited to use for a crankshaft of an internal combustion engine, and the dual-type damper is serviceable for various rotation axles which produce vibration, with good results as described about the illustrative examples.

Although the illustrative examples of the dual-type damper also serve as a V-ribbed pulley, the V-shaped grooves may not be provided. That is, the dual-type damper may be adapted to serve only as a vibration damper for damping vibration of a rotation axle.

In the illustrative examples of the dual-type damper, the first damper mass 22 is connected to the metallic sleeve 20 through vulcanization of the first resilient member 24 therebetween, and the thus-formed assembly is press-fitted onto the outer surface of the cylindrical portion 16 of the damper pulley 12. The metallic sleeve 20 located innermost of the assembly is useful for the press-fitting. However, an important requirement is that the first damper mass 22 is secured to the damper pulley 12 by way of the first resilient member 24 therebetween. Therefore, the first damper mass 22 may be press-fitted onto an outside surface of the metallic sleeve 20 located outermost of an assembly which consists of the metallic sleeve 20, the pulley 12, and the first resilient member 24 vulcanized between the sleeve 20 and the pulley 12. Furthermore, the first damper mass 22 may be connected to the damper pulley 12 through only vulcanization of the first resilient member 24 between the first mass 22 and the pulley 12. In this case, the metallic sleeve is omitted.

What is claimed is:

1. A dual-type damper device for damping vibration of a rotation axle having a longitudinal axis, comprising:
    a damper pulley including a boss portion rotatable with said rotation axle, a cylindrical portion located radially outwardly of said boss portion, and a connection portion connecting said boss portion and said cylindrical portion;
    a first damper-mass member disposed radially outwardly of said cylindrical portion of said damper pulley, such that said first damper-mass member is spaced apart from, and concentric with, said cylindrical portion;
    a first resilient member interposed between said cylindrical portion of said damper pulley and said first damper-mass member;
    a second damper-mass member having a cylindrical shape and disposed concentrically in an inner space of said cylindrical portion of said damper pulley; and
    a second resilient member disposed between one of the longitudinal axial ends of said second damper-mass member and a corresponding part of said connection portion of said damper pulley which is opposed to said one longitudinal axial end of said second damper-mass member, said second resilient member securing said second damper-mass member to said connection portion, said second resilient member being subjected to shear deformation due to relative radial displacement between said second damper-mass member and said connection portion of said damper pulley.

2. A dual-type damper device according to claim 1, wherein said second damper-mass member is vulcanized to said connection portion of said damper pulley, between said one longitudinal axial end of said second damper-mass member and said corresponding part of said connection portion.

3. A dual-type damper device according to claim 1, wherein said first damper-mass member is in the form of a V-ribbed cylindrical body which has in an outside surface thereof a plurality of V-grooves.

4. A dual-type damper device according to claim 1, further comprising stopper means cooperating with the opposite longitudinal axis end of the second damper-mass member for preventing said second damper-mass member from falling off the dual-type damper device.

5. A dual-type damper device according to claim 4, wherein said second damper-mass member has at least one through-hole extending axially of said second damper-mass member, and said stopper means comprises at least one stopper pin which is inserted in said at least one through-hole, such that said at least one stopper pin is fixed at one of axial ends thereof to said connection portion of said damper pulley, said at least one stopper pin having at the other axial end thereof a head portion with a larger diameter than a diameter of said at least one through-hole.

6. A dual-type damper device according to claim 5, wherein said at least one through-hole comprises a pair of through-holes which are diametrically opposite to each other.

7. A dual-type damper according to claim 4, wherein said stopper means comprises a circular member which is made of a metallic material and which faces the other axial end of said second damper-mass member such that said circular member is spaced a predetermined distance apart from said second damper-mass member, said circular member being secured to one of axial ends of said cylindrical portion of said damper pulley which corresponds to the other axial end of said second damper-mass member.

8. A dual-type damper device according to claim 7, wherein said circular member has at a circumferential edge thereof an attachment portion which is secured to said one axial end of said cylindrical portion of said damper pulley.

9. A dual-type damper device according to claim 7, wherein said circular member has at a circumferential edge thereof a flange-like fit portion which is secured onto an inside surface of said cylindrical portion of said damper pulley, at said one axial end of said cylindrical portion.

10. A dual-type damper device according to claim 4, further comprising a set bolt for joining said boss portion of said damper pulley to said rotation axle, wherein said set bolt is located inside said second damper-mass member and fixed to said rotation axle, and said stopper means comprises a circular member which is fixed at a central part thereof to said set bolt and which faces the other axial end of said second damper-mass member such that said circular member is spaced a predetermined distance apart from said second damper-mass member.

11. A dual-type damper device according to claim 10, wherein said circular member has a hat-like shape which includes an inner shallow-cup portion and an outer annular portion, said outer annular portion facing the other axial end of said second damper-mass member, said inner shallow-cup portion being secured to said set bolt.

12. A dual-type damper device according to claim 11, wherein said outer annular portion of said circular member is located outside said cylindrical portion of said damper pulley, while bottom part of said inner shallow-cup portion is located inside said second damper-mass member.

13. A dual-type damper device according to claim 10, wherein said annular member has at least one air-communication hole formed therethrough for communicating between said inner space of said cylindrical portion of said damper pulley and an outer space of the dual-type damper.

* * * * *